United States Patent
Li et al.

(10) Patent No.: US 9,225,586 B2
(45) Date of Patent: Dec. 29, 2015

(54) AUTOMATIC EXPANSION METHOD, MANAGEMENT DEVICE, MANAGEMENT SYSTEM

(75) Inventors: Lijuan Li, Shenzhen (CN); Zhefeng Yan, Shenzhen (CN); Tieying Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 956 days.

(21) Appl. No.: 13/415,509

(22) Filed: Mar. 8, 2012

(65) Prior Publication Data

US 2012/0173695 A1  Jul. 5, 2012

Related U.S. Application Data

(63) Continuation of application No. PCT/CN2010/076517, filed on Sep. 1, 2010.

(30) Foreign Application Priority Data

Sep. 8, 2009  (CN) .......................... 2009 1 0169906

(51) Int. Cl.
*G06F 15/173* (2006.01)
*H04L 12/24* (2006.01)
*H04L 29/08* (2006.01)

(52) U.S. Cl.
CPC ........ *H04L 41/042* (2013.01); *H04L 29/08153* (2013.01); *H04L 67/104* (2013.01); *H04L 67/1046* (2013.01)

(58) Field of Classification Search
CPC .. H04L 41/042; H04L 67/104; H04L 67/1046
See application file for complete search history.

(56) References Cited

U.S. PATENT DOCUMENTS 6,041,358 A * 3/2000 Huang ................ H04L 12/4608
370/331
2005/0237948 A1* 10/2005 Wan ........................ H04L 29/06
370/254

(Continued)

FOREIGN PATENT DOCUMENTS

| CN | 1581188 A | 2/2005 |
|---|---|---|
| CN | 1638353 A | 7/2005 |

(Continued)

OTHER PUBLICATIONS

International Search Report and Publication issued in PCT Patent Application No. PCT/CN2010/076517, mailed Dec. 9, 2010.

(Continued)

*Primary Examiner* — Dhairya A Patel
(74) *Attorney, Agent, or Firm* — Brinks Gilson & Lione

(57) ABSTRACT

An automatic expansion method, a management device, and a management system are disclosed in the embodiments of the present invention. In the embodiments of the present invention, information about added management nodes is received from a node management server when a new node is added, where the information about the added management nodes comprises at least address information of the added management nodes; the address information of the added management nodes is used to obtain an index corresponding to a continuous identifier (ID) segment; and an adding message of the new node is sent to all added management nodes, where the adding message includes at least a continuous ID segment managed by the new node and address information of the new node.

9 Claims, 7 Drawing Sheets

(56) References Cited

U.S. PATENT DOCUMENTS

2008/0055113 A1* 3/2008 Muro ............... G06Q 10/00 340/870.16
2012/0173695 A1* 7/2012 Li ................. H04L 41/042 709/223

FOREIGN PATENT DOCUMENTS

| CN | 101098271 A | 1/2008 |
| CN | 101251789 A | 8/2008 |
| CN | 101452406 A | 6/2009 |
| WO | WO 98/38759 A2 | 9/1998 |
| WO | WO 2008/129686 A1 | 10/2008 |

OTHER PUBLICATIONS

Office Action issued in corresponding Chinese Patent Application No. 200910169906.5, mailed Jan. 31, 2012.
Written Opinion of the International Searching Authority issued in PCT Patent Application No. PCT/CN2010/076517, mailed Dec. 9, 2010.
Li et al., "Load Balancing Algorithm Based on Network Positioning in Structured P2P Systems" Application of Research Computers, vol. 25 No. 8. 2008.
Author Unknown, "Construction of China Mobile the DSMP application-level disaster recovery systems" Mobile Communication, Feb. 2008.

* cited by examiner

AUTOMATIC EXPANSION METHOD, MANAGEMENT DEVICE, MANAGEMENT SYSTEM

CROSS-REFERENCE TO RELATED APPLICATIONS

This application is a continuation of International Application No. PCT/CN2010/076517, filed on Sep. 1, 2010, which claims priority to Chinese Patent Application No. 200910169906.5, filed on Sep. 8, 2009, both of which are hereby incorporated by reference in their entireties.

FIELD OF THE INVENTION

The present invention relates to the field of communication technologies, and in particular, to an automatic expansion method, a management device, and a management system.

BACKGROUND OF THE INVENTION

The global data amount is growing explosively, and people raise higher and higher requirements on capacity of data storage in the network system. However, as the capacity of data storage increases, how to manage the mass data stored in the network system emerges.

A management system is required to manage the mass data stored in the network system. Through the management system, the administrator can conveniently manage the stored data content, learn the operation state of the network system and the data distribution, and view or modify the application state. The rising amount of data leads to bottleneck of storage capacity and management quality of the management system. Therefore, it is required to expand the storage capacity of the management system, that is, add new nodes in the management system, to solve the problem.

In the prior art, the solution to expand the storage capacity of the management system mainly includes:

When the management system is overloaded, a new node is added in the management system, several heavy-loaded nodes are selected randomly among the original nodes of the management system, and some of the load on the selected heavy-loaded nodes is migrated to the new node.

In the process of implementing the foregoing solution, the inventor finds the prior art at least has the following problems: The identifier (ID) segments in the index of the original nodes are continuous; after some indexes (representative of load) is migrated from each of the several original nodes to the new node, the ID segment in the index of the new node is discontinuous, which leads to low efficiency of searching for files.

SUMMARY OF THE INVENTION

The embodiments of the present invention provide an automatic expansion method, a management device, and a management system to implement fast search.

To achieve the foregoing objectives, the embodiments of the present invention adopt the following technical solutions:

An automatic expansion method includes:

receiving information about added management nodes from a node management server when a new node is added, where the information about the added management nodes includes at least address information of the added management nodes;

using the address information of the added management nodes to obtain an index corresponding to a continuous ID segment; and sending an adding message of the new node to all added management nodes, where the adding message includes at least a continuous ID segment managed by the new node and address information of the new node.

A management device includes:

a receiving module, configured to receive information about added management nodes from a node management server, where the information about the added management nodes includes at least address information of the added management nodes;

an obtaining module, configured to use the address information of the added management nodes to obtain an index corresponding to a continuous ID segment; and a sending module, configured to send an adding message of the new node to all added management nodes, where the adding message includes at least a continuous ID segment managed by the new node and address information of the new node.

The solutions provided in the embodiments of the present invention has at least the following benefits: The ID segment in the index obtained by the new node is continuous, which enables quick search for the ID of a desired file; during the process of adding the new node to the management system, generally, the obtained index corresponding to the ID is a part of the whole system index, and therefore, in the process of obtaining the index, the impact on the whole management system is small, and little workload is involved in the expansion process.

BRIEF DESCRIPTION OF THE DRAWINGS

To illustrate the technical solutions according to the embodiments of the present invention or the prior art more clearly, the accompanying drawings for describing the embodiments of the present invention or the prior art are outlined below. Apparently, the accompanying drawings described below are merely about some embodiments of the present invention, and persons of ordinary skill in the art can derive other drawings from the accompanying drawings without any creative effort.

DETAILED DESCRIPTION OF THE EMBODIMENTS

Figure 1:
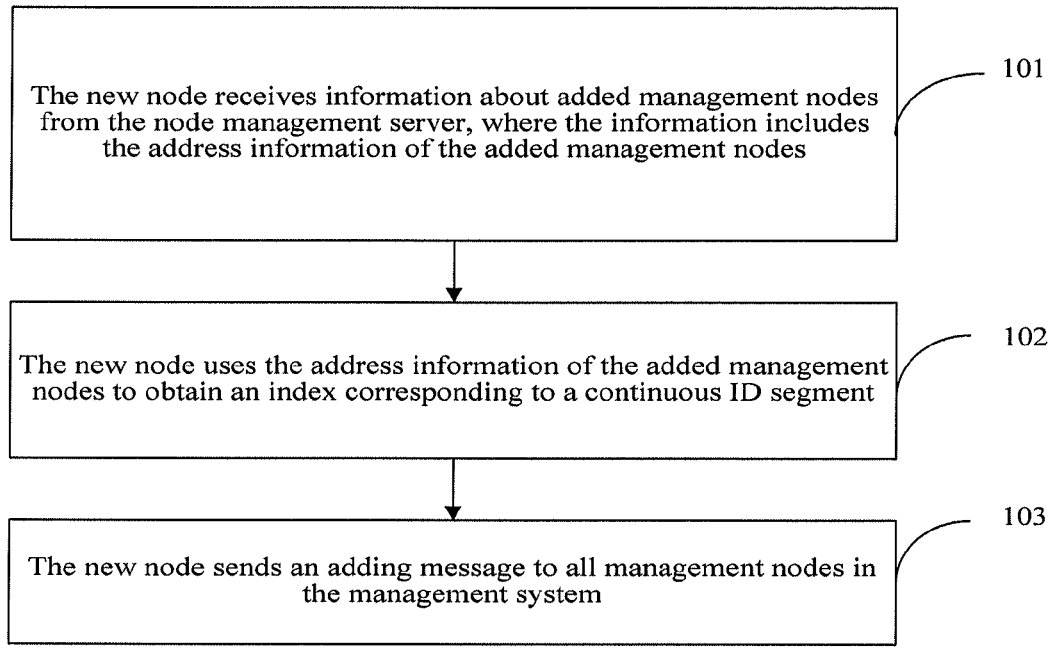
FIG. 1 is a schematic flowchart of an automatic expansion method according to a first implementation solution of the present invention.

In a platform of storing mass data, each file has a unique ID—file ID. The file ID may be a 160-bit binary number formed of a Hash value of the file. When the user needs to upload the file onto the storage platform, a 160-bit Hash value is calculated for the file content, and the Hash value is used as a unique ID of the file and is requested to be uploaded onto the storage platform. After the Hash value is uploaded successfully, the storage platform automatically registers information about a series of uploaded files and information about an application (APP) server to which the uploaded files, belongs to into the management system. The registered property values include: file ID, file type, application server ID, Universal Resource Locator (URL), and indication of whether the information is public or not. After receiving the registration request, a management node responsible for managing the ID of the file inserts an index corresponding to the file into an orderly content list.

The technical solutions according to the embodiments of the present invention are described clearly and comprehensively with reference to the accompanying drawings. Evidently, the embodiments to be described are merely some embodiments rather than all embodiments of the present invention. All other embodiments derived by those skilled in the art from the embodiments provided in the embodiments of the present invention without any creative effort shall fall within the protection scope of the present invention. Notice that the following embodiments are optional embodiments of the present invention, and the arrangement order and the sequence number of the embodiments are not related to the preference order of implementing the embodiments.

In an embodiment of the present invention, a local data structure needs to be initialized upon startup of each new node that is added to a management system (including a new node that is firstly added to the management system). The initialization includes:

Creating a management content space: to record the ID segment managed by this node, including the start ID and the end ID of the ID segment;

Creating an information list of other management nodes: to record the address and port information of each management node in the management system, including at least the IP port, IP-TCP port, and IP-UDP port of each management node, and the ID segment managed by each management node; and Creating a content list: to record basic index information of each file in the storage platform in the order of the file ID, and the basic index information includes at least file ID, file checksum, file type, the number of counterparts, file size, indication of whether to be public or not, and application ID.

After the local data structure is initialized, a new node sends to the node management server a message with a request for obtaining information about the added management nodes. After receiving the message, the node management server selects information about at least three added management nodes in a locally created list of the added management nodes, returns the information to the new node that sends the message, and records the new node into the list of the added management nodes. If the number of the management nodes in the list of the added management nodes in the node management server is less than three, the node management server returns all information in the list of the added management nodes to the new node as information about the added management nodes. The information about the added management nodes returned by the node management server includes at least address information of each added management node.

A first implementation solution of the present invention is provided in the embodiment: an automatic expansion method. As shown in FIG. 1, the method includes:

After a new node initializes a local data structure.

S101. The new node receives information about added management nodes from a node management server, where the information about the added management nodes includes at least address information of the added management nodes.

S102. The new node uses the address information of the added management nodes to obtain an index corresponding to a continuous ID segment.

S103. The new node sends an adding message to all management nodes that are existent in the management system, so that all management nodes that are existent in the management system learn the adding of the new node. The adding message includes at least a continuous ID segment managed by the new node (namely, the ID segment obtained by the new node in S102) and address information of the new node.

In the automatic expansion method provided in this embodiment, the solution that the index IDs obtained by the new node are continuous are adopted to overcome the technical problem that the speed of locating the ID corresponding to the file is slow due to discontinuous ID segments in the prior art; moreover, the obtained index is an index corresponding to the ID segment, that is, the impact on the management system is restricted to the impact on the management node where the obtained index is located. Therefore, the impact on the whole management system is small, and a technical effect that workload is reduced during the expansion process.

The following embodiment describes an automatic expansion method of a second implementation solution of the present invention. The solution describes in detail an expansion process that occurs when a first new node is added to a management system under a condition that the management system is initially created and no management node exists in the management system.

Figure 2:
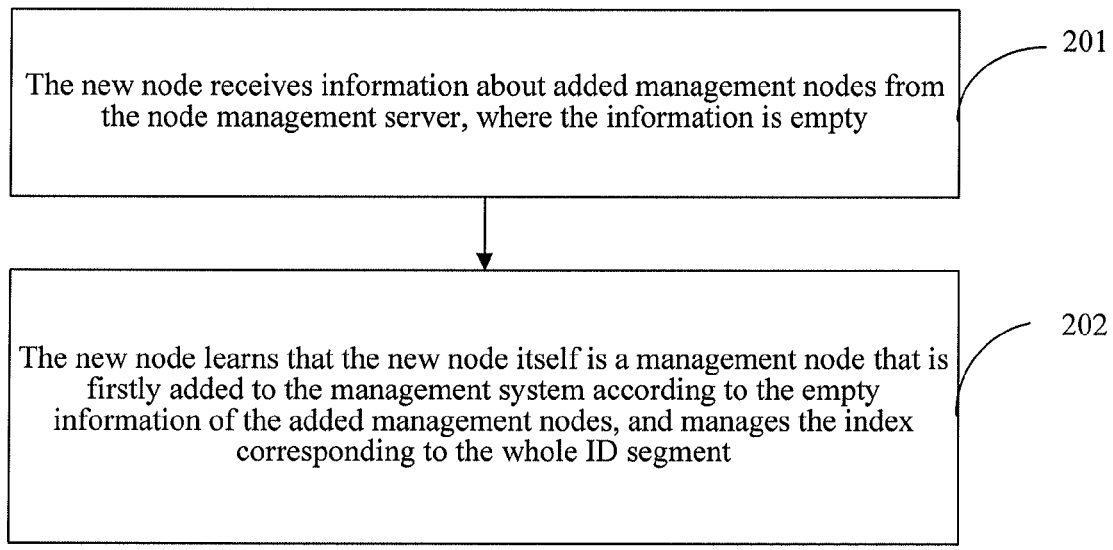
FIG. 2 is a schematic flowchart of an automatic expansion method according to a second implementation solution of the present invention.

It should be noted here that no added management node exists in the management system at this time, and therefore, information about added management nodes returned by the node management server is empty. As shown in FIG. 2, the method includes:

The new node completes initiation of the local data structure, namely, the new node has created a management content space, an information list of other management nodes, and a content list.

S201. The new node receives information about added management nodes returned from the node management server, where the information is empty.

S202. The new node may judge, according to the empty information of the added management nodes, that the new node itself is a management node that is firstly added to the management system. The new node manages the index corresponding to the whole file ID segment, for example, processes all file management requests, records sequentially all indexes registered on the storage platform into the created content list, configures the created management content space as the ID segment of the whole file (00 . . . 00-11 . . . 11), and configures the created information list of other management nodes as empty.

The solution provided in this embodiment has the following benefits: The expansion solution in the process of adding the first new node to the management system when the management system is initially created is provided. In this embodiment, the ID segment of the new node is continuous, all IDs can be searched out, little workload is involved in migrating indexes in the expansion process, and the expansion process occurs automatically without manual operation, which improves availability of the management system.

The embodiment continues to disclose an automatic expansion method of a third implementation solution of the present invention. The solution describes in detail an expansion process that occurs when a new node is added to the management system as a second management node under a condition that only one management node exists in a management system.

Figure 3:
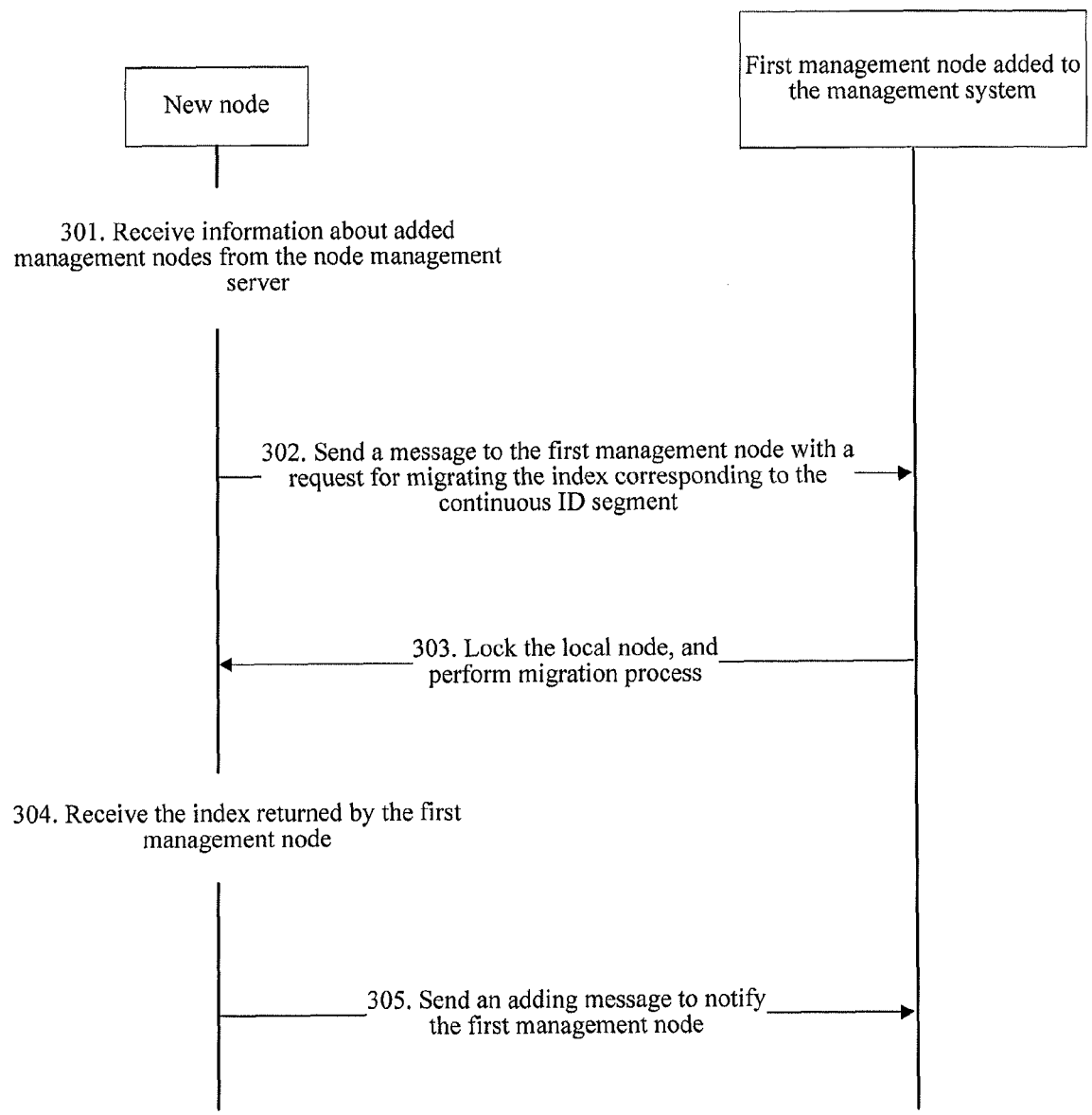
FIG. 3 is a schematic flowchart of an automatic expansion method according to a third implementation solution of the present invention.

It should be noted here that the management system has only one management node at this time, and therefore, information about added management nodes returned by a node management server includes address information of only one management node, namely, the information about a first management node that is already added to the management system, and the information includes at least the whole ID segment managed by the first management node and the address information of the first management node. As shown in FIG. 3, the method includes:

The new node completes initiation of a local data structure, namely, the new node creates a management content space, an information list of other management nodes, and a content list.

S301. The new node receives information about added management nodes returned by the node management server, where the management node information includes the address information of the first management node.

S302. The new node may judge, according to the forgoing information, that the new node itself is the second management node that is added to the management system. The new node obtains an index of a first half or a last half of the ID segment (namely, the ID segment of the whole file) managed by the first management node, and uses the obtained index as the index corresponding to a continuous ID segment managed by the new node itself. Meanwhile, the new node configures the created management content space as the first half or last half of the ID segment of the whole file, and configures an information list of other management nodes according to the received management node information. The configured information list of other management nodes includes only one item, namely, the information about the first management node that is existent in the management system. The new node sends a request message to the first management node, and requests the first management node to migrate the index corresponding to the first half or the last half of the ID segment to the new node.

S303. After receiving the request message, the first management node confirms that the requested ID segment is managed by the first management node itself, and then locks the local node, that is, does not respond to requests sent by other nodes. The first management node performs migration and searches for the index requested by the new node one by one, and then migrates the requested index to the new node. After the migration is completed, the first management node is unlocked.

Meanwhile, because the ID segment managed by the first management node also changes, the first management node sends a change message to the new node and the node management server, to notify the new node and the node management server that the ID segment managed by the first management node itself has changed. The new node may update its own information list of other management nodes according to the change message, and the node management server maintains its own list of added management nodes according to the change message.

S304. The new node receives an index returned by the first management node, and records the index into a created content list sequentially.

S305. The new node sends an adding message to the first management node. The adding message includes at least the address information of the new node and the continuous ID segment managed by the new node.

The technical solution provided in this embodiment has the following benefits: The ID segment managed by each management node is a continuous ID segment and has good stability, which may speeds up the search; the expansion process is automatic when the new node is added, that is, automatic expansion can be implemented when the new node is initialized and added to the management system, and the expansion process involves no manual operation; the management system takes account of the load difference between nodes in the system at the time of expansion, and the migrated index is a part of the load of the whole system and causes little impact on the whole management system, which accordingly reduces workload during the expansion process.

The embodiment continues to disclose an automatic expansion method of a fourth implementation solution of the present invention. The solution describes in detail an expansion process that occurs when a new node is added to the management system under a condition that at least two management nodes exist in a management system.

Figure 4:
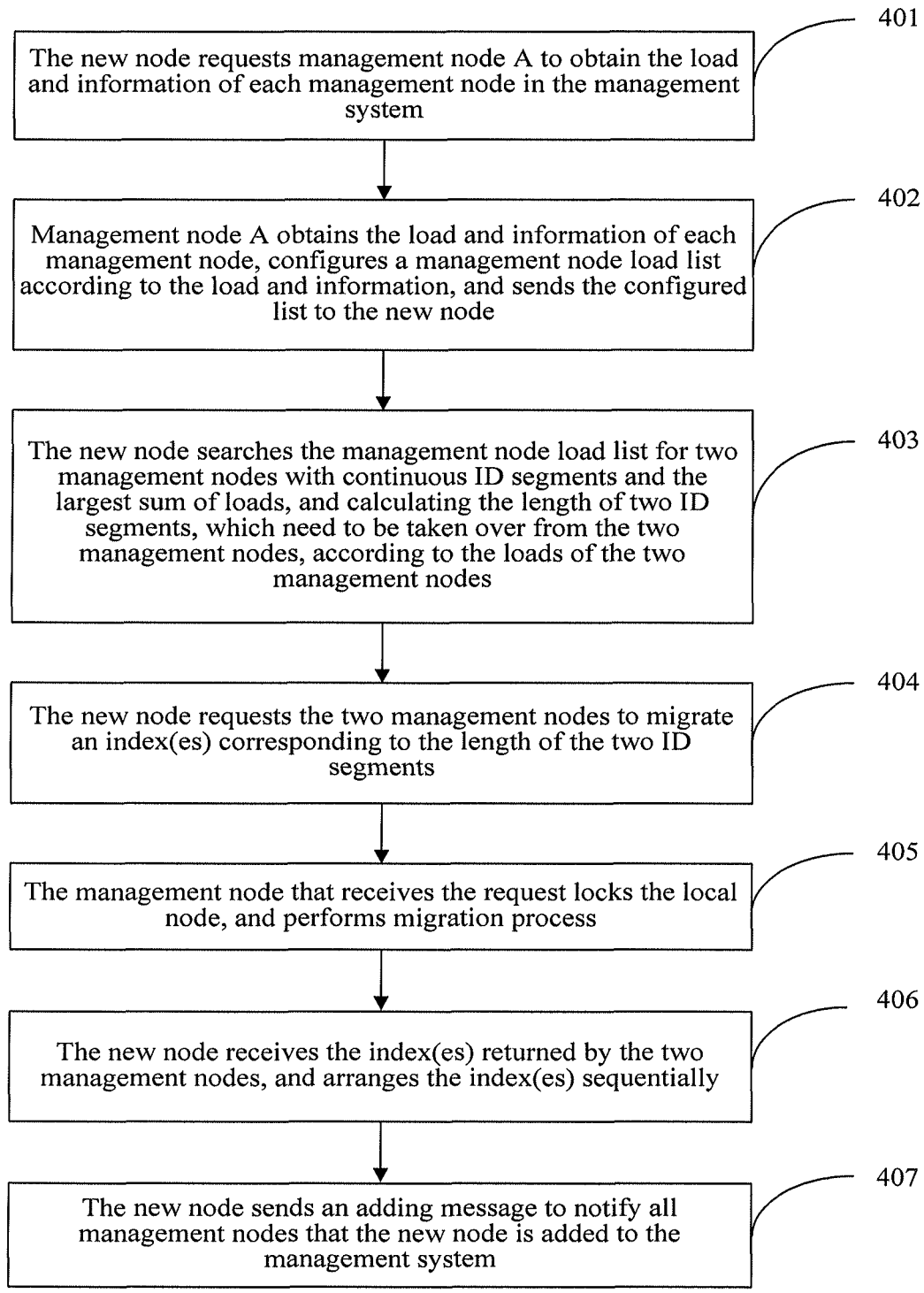
FIG. 4 is a schematic flowchart of an automatic expansion method according to a fourth implementation solution of the present invention.

It should be noted here that the management system has multiple added management nodes at this time, and therefore, information about the added management nodes returned by the node management server at least includes a continuous ID segment managed by each of two management nodes and address information of each of the two management nodes. As shown in FIG. 4, the method includes:

The new node completes initiation of a local data structure, namely, the new node has created a management content space, an information list of other management nodes, and a content list.

S401. The new node receives the information about the added management nodes returned by the node management server, and sends a request to any management node according to the address information of the management node. In this embodiment, it is assumed that the request is sent to management node A, and the new node requests the management node A to obtain the load and information of each management node in the management system.

S402. The management node A requests the load and information from each management node in the management system. The information includes at least the address information of the requested management node and the ID segment managed by the requested management node. Each management node that receives the request from the management node A judges whether the node itself is in a locked state. If the node itself is in a locked state, the node returns empty in response to the request; if the node itself is not in a locked state, the node returns its own load and information to the management node A. The load is obtained by calculating, by the management node, the weighted average sum of its own transaction queue length, the number of content records, the number of alarms in a period, and the number of received requests. The management node A uses the received load and information returned by each management node and the load and information of the management node A to configure a management node load list, and sends the management node load list to the new node.

S403. The new node configures its own information list of other management nodes according to information in the management node load list, searches the management node load list for two management nodes with continuous ID segments and the largest sum of loads, and then calculates out, according to the loads of the two found management nodes, the length of ID segments corresponding to an index(es) that needs to request being migrated from the two management nodes, that is, the length of two ID segments may be taken over from the two management nodes; a continuous ID segment corresponding to the length of the two ID segments is used as an obtained ID segment, and the management content space is configured according to the obtained ID segment.

The specific process of calculating out, according to the loads of the two found management nodes, the length of ID segments corresponding to the index(es) that needs to request being migrated from the two management nodes may be: Assumed that management node M and management node N are found, the ID segment of M is ahead of the ID segment of N and is in tandem with the ID segment of N, the load of M is m, and the load of N is n, and therefore, the length of the ID segment corresponding to the index that requests being migrated from M is $m/(m+n)*2/3$ at the end of the ID segment of M, and the length of the ID segment corresponding to the index that requests being migrated from N is $n/(m+n)*2/3$ at the front of the ID segment of N. It can be seen from the above description that the ID segment corresponding to the index migrated from the heavier-loaded management node of the two management nodes is longer.

The using the continuous ID segment corresponding to the length of the two ID segments as the obtained ID segment includes: using the combination of $m/(m+n)*2/3$ and $n/(m+n)*2/3$ as the length of the ID segment to be taken over by the new node, and using the continuous ID segment corresponding to the length as the ID segment that may be taken over by the new node.

Because the ID segments of the two found management nodes are continuous, the parts taken over from the ID segments of the two management nodes make up a continuous ID segment.

S404. The new node sends a corresponding migration request to each of the two found management nodes according to the calculated length of the two ID segments, to request the management nodes to migrate the index(es) corresponding to the length of the two ID segments.

That is, the new node requests M to migrate out $m/(m+n)*2/3$ index(es) at the end of the ID segment of M, and requests N to migrate out $n/(m+n)*2/3$ index(es) at the front of the ID segment of N.

S405. The management node that receives the request confirms that the requested ID segment is managed by the management node itself, and then locks the local node, that is, does not respond to requests sent by other nodes. The management node performs migration process and searches for the index requested by the new node one by one, and then migrates the requested index to the new node. After the migration is completed, the management node is unlocked.

Meanwhile, because the ID segment managed by each of the two management nodes that receives the request also changes, each of the two management nodes sends a change message to the new node and the node management server, to notify the new node and the node management server that the ID segment managed by itself has changed. The new node updates its own information list of other management nodes according to the change message, and the node management server maintains its own list of added management nodes according to the change message.

S406. The new node receives an index(es) returned by the two management nodes, and records the index(es) into a created content list sequentially.

S407. The new node sends an adding message to each management node in the management system. The adding message includes at least the address information of the new node and the continuous ID segment managed by the new node.

The management node that receives the adding message may updates its own information list of other management nodes according to new node information carried in the adding message.

The automatic expansion method provided in this embodiment of the present invention may be applicable to an automatic expansion process performed by a management system for a mass data storage platform. The expansion process involves no manual operation, and is highly practicable. The whole management system is distributed, each management node manages a continuous ID segment, and each management node also records information about all other management nodes and ID segments managed by the all other management nodes. Therefore, any management node can serve as a portal for quickly locating the management node where the ID of the file that needs to be searched for is located. At the time of expansion, the length of the ID segment to be migrated is determined according to the loads of the two selected management nodes, so that the new node may better balance the load of the management system after being added to the management system, and workload involved in the expansion process is reduced. The solution provided in this embodiment of the present invention takes account of load difference between management nodes in the management system in the case of expansion. Therefore, when each new node is added, two management nodes with heaviest loads are selected for migrating out the index(es), and no impact will be caused to other management nodes and the other management nodes can perform normal processing and provide management service, the impact caused to the service performance of the whole management system is low.

If multiple new nodes request being added to the management system simultaneously, interference and exception tend to occur in the expansion process. To solve such problems, two optional solutions are provided in the embodiment.

Figure 5:
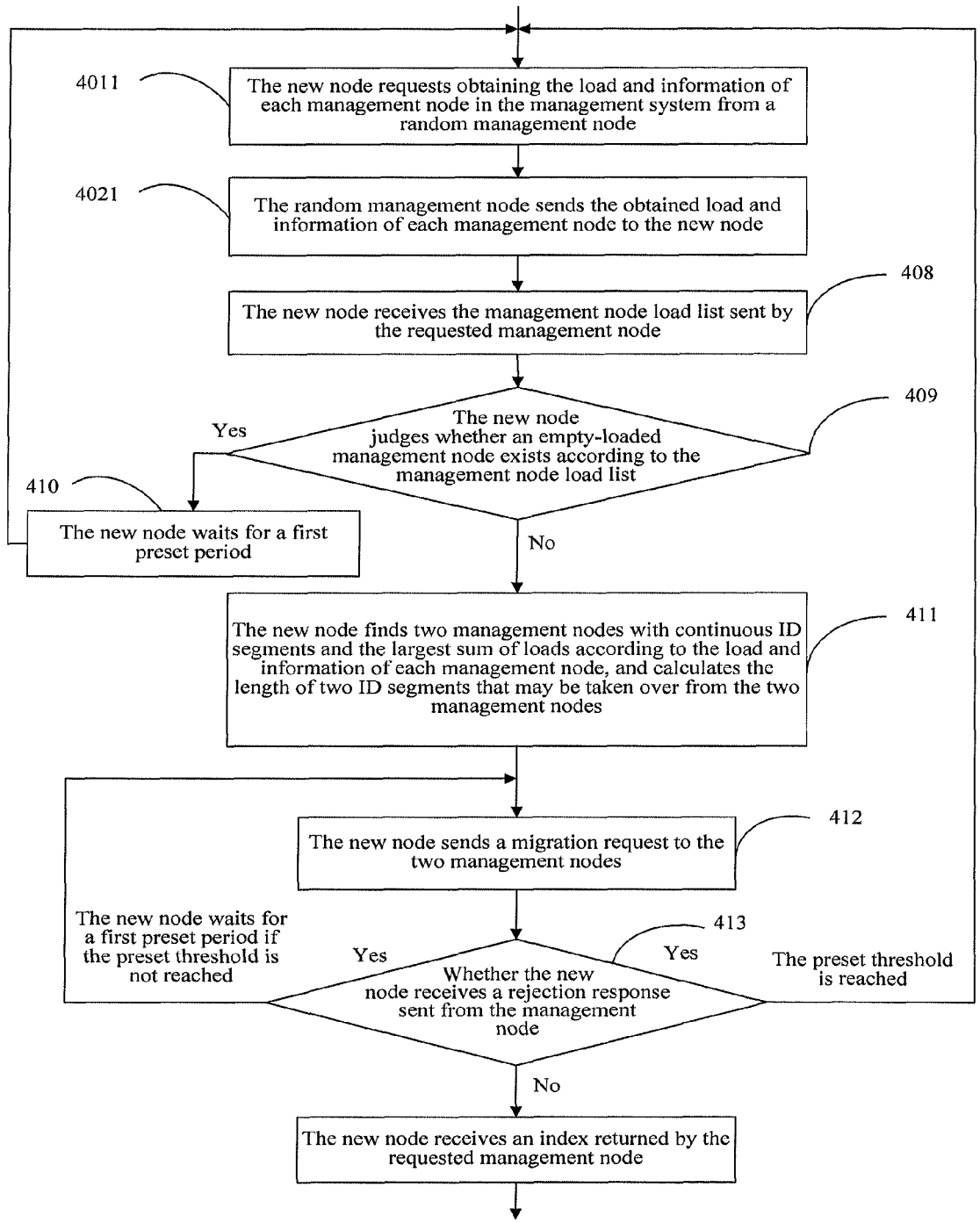
FIG. 5 is a schematic diagram of a waiting solution that multiple new nodes request being added to a management system simultaneously according to the fourth implementation solution of the present invention.

The first solution is a waiting solution when multiple new nodes request being added to a management system simultaneously. As shown in FIG. 5, the first solution includes:

For each of the multiple new nodes, after a local data structure is initialized.

S4011. A new node requests obtaining the load and information of each management node in the management system from a random management node.

For the detailed execution process, refer to S401 above.

S4021. The random management node obtains the load and information of each management node, configures a management node load list according to the load and information, and sends the list to the new node.

For detailed execution process, refer to S402 above.

S408. The new node receives the management node load list sent by the requested management node.

S409. The new node judges whether an empty-loaded management node exists according to the management node load list; if an empty-loaded management node exists, S410 is performed; if an empty-loaded management node does not exist, S411 is performed.

The empty-loaded management node may reflect that the management node is in a locked state, that is, the management node is performing migration process, and at this time, the management node does not process requests from other management nodes.

S410. The new node waits for a first preset period, and performs S4011 after the first preset period.

S411. The new node configures its own information list of other management nodes according to information in the management node load list, searches the management node load list for two management nodes with continuous ID segments and the largest sum of loads, and then calculates out, according to the loads of the found two management nodes, the length of two ID segments corresponding to an index(es) that needs to request being migrated from the two management nodes, that is, the length of two ID segments may be taken over from the two management nodes; a continuous ID segment corresponding to the length of the two ID segments is used as an obtained ID segment, and the management content space is configured according to the obtained ID segment.

S412. The new node sends a corresponding migration request to each of the two found management nodes according to the calculated length of the two ID segments, to request the management nodes to migrate the index(es) corresponding to the length of the ID segments.

S413. If the new node receives a rejection response from the requested management node (the rejection response of the requested management node may represent that the management node is in a locked state, that is, the management node is performing migration process, and therefore the management node does not respond to requests from other management nodes). In this case, the new node waits for a second preset period, and accumulates the number of times of waiting for the second preset period. After expiry of the second preset period, if the accumulated number of the times of waiting for the second preset period does not reach a preset threshold, S412 is performed; if the second preset period expires, and the accumulated number of the times of waiting for the second preset period reaches the preset threshold, S4011 is performed. If the new node receives an index returned from the requested management node, the procedure may start over with S406 in this embodiment.

Figure 6:
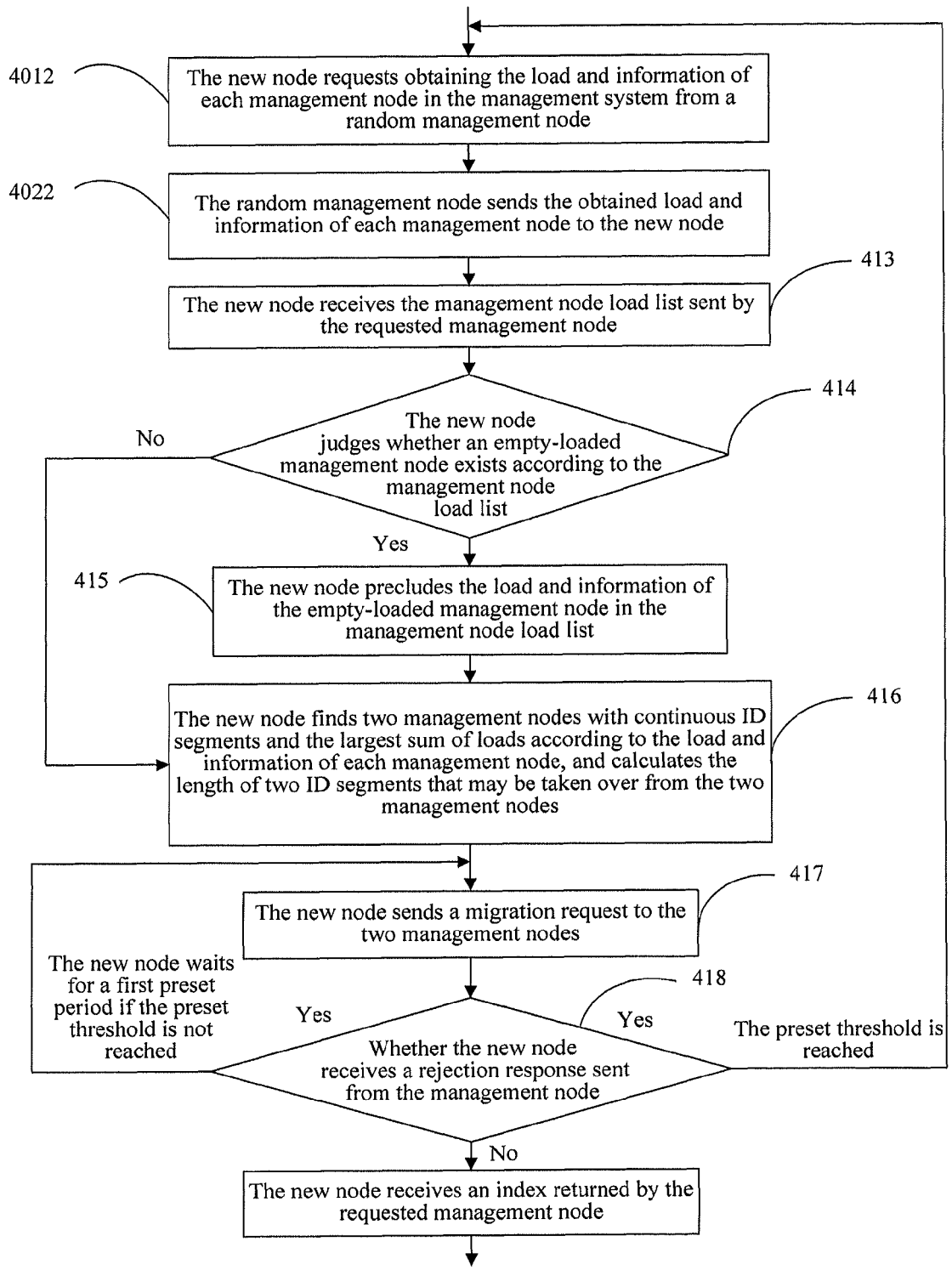
FIG. 6 is a schematic diagram of a quiting solution that multiple new nodes request being added to a management system simultaneously according to the fourth implementation solution of the present invention.

The second solution is a precluding solution when multiple new nodes request being added to a management system simultaneously. As shown in FIG. 6, the second solution includes:

For each of the multiple new nodes, after a local data structure is initialized.

S4012. A new node requests obtaining the load and information of each management node in the management system from a random management node.

For detailed execution process, refer to S401 above.

S4022. The random management node obtains the load and information of each management node, configures a management node load list according to the load and information, and sends the list to the new node.

For detailed execution process, refer to S402 above.

S413. The new node receives the management node load list sent by the requested management node.

S414. The new node judges whether an empty-loaded management node exists according to the management node load list; if an empty-loaded management node exists, the S415 is performed; if an empty-loaded management node does not exist, S416 is performed.

The empty-loaded management node may represent that the management node is in a locked state and is performing migration process, and at this time the management node does not process requests from other management nodes.

S415. The new node precludes the load and information of the empty-loaded management node in the management node load list.

S416. The new node configures its own information list of other management nodes according to information in the management node load list, searches the management node load list for two management nodes with continuous ID segments and the largest sum of loads of the two management nodes, and then calculates out, according to the load of the found two management nodes, the length of two ID segments corresponding to an index(es) that needs to request being migrated from the two management nodes, that is, the length of two ID segments may be taken over from the two management nodes; a continuous ID segment corresponding to the length of the two ID segments is used as an obtained ID segment, and the management content space is configured according to the obtained ID segment.

S417. The new node sends a corresponding migration request to each of the two found management nodes according to the calculated length of the two ID segments, to request the management nodes to migrate the index(es) corresponding to the length of the two ID segments.

S418. If the new node receives a rejection response from the requested management node, the new node waits for a second preset period, and accumulates the number of times of waiting for the second preset period. After expiry of the second preset period, if the accumulated number of the times of waiting for the second preset period does not reach a preset threshold, S417 is performed; if the accumulated number of the times of waiting for the second preset period reaches the preset threshold, S4012 is performed. If the new node receives an index returned from the requested management node, the procedure may start over with S406 in this embodiment.

In the first solution and the second solution above, the first preset period may be the same as or different from the second preset period; the first period and the second period may be implemented through the same program or apparatus, or may be implemented through different programs or apparatuses, which is not limited by the embodiment of the present invention.

The foregoing two expansion solutions applied when multiple new nodes request being added to a management system simultaneously have the following benefits: When multiple new nodes are added to the management system simultaneously, no interference or exception occurs, and the ID segment is not discrete or overlapped.

Figure 7:
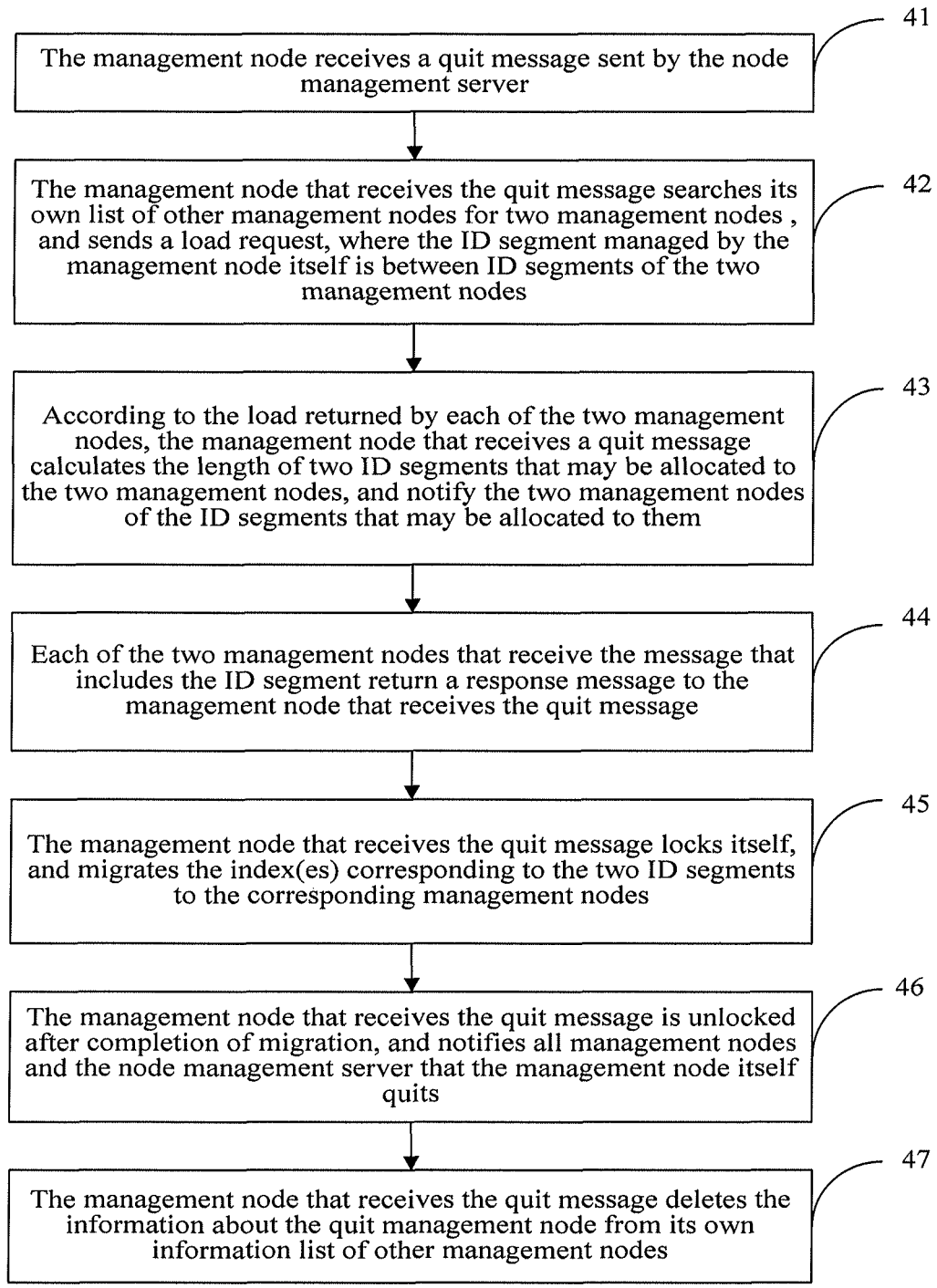
FIG. 7 is a schematic diagram of a solution that a management node quits a management system according to the fourth implementation solution of the present invention.

The following continues to describe in the embodiment a solution that a management node quits a management system for some reasons, such as, the aging and elimination of certain management node. As shown in FIG. 7, the solution includes:

S41. The management node receives a quit message sent by the node management server.

Specifically, in this embodiment, it is assumed that a management node that needs to quit the management system is S, and S receives the quit message sent by the node management server.

S42. The management node that receives the quit message searches its own list of other management nodes for two management nodes, where the ID segment managed by the management node itself is between ID segments of the two management nodes; sends a load request; and requests the loads of the two management nodes from the two management nodes.

Specifically, it is assumed that the two found management nodes are M1 and N1. That is, the ID segment of S is between the ID segments managed by M1 and N1, and it is assumed that the order of the ID segments of the three management nodes is: ID segment of M1, ID segment of S, ID segment of N1. S sends a load request to M1 to request the load of M1, and S sends a load request to N1 to request the load of N1.

S43. According to the load returned by each of the two management nodes, the management node that receives the quit message calculates the length of two ID segments that may be migrated to the two management nodes, and sends a message, which includes an ID segment corresponding to the length of the ID segments, to each of the two management nodes, and notifies the two management nodes of the ID segments that are to be allocated to the two management nodes.

Specifically, it is assumed that the load returned by M1 is m1 and the load returned by N1 is n1, the ID segment length that may be migrated from S to M1 is $m1/(m1+n1)*2/3$ at the end of the ID segment of M1, and the ID segment length that may be migrated from S to N1 is $n1/(m1+n1)*2/3$ at the front of the ID segment of N1. S sends a message to M1, where the message includes an ID segment corresponding to $m1/(m1+n1)*2/3$; and sends a message to N1, where the message includes an ID segment corresponding to $n1/(m1+n1)*2/3$.

In certain special conditions, M1 and N1 are heavy loaded, and the sum of length of two ID segments that is calculated by S according to the loads m1 and n1 is less than the length of the ID segment of S. In this case, it represents that indexes recorded on S cannot be completely migrated to M1 and N1. To ensure continuity of the ID segment after the migration, the following solution is applicable: S waits for decrease of the loads of M1 and N1 until the sum of length of the two ID segments is not less than the length of the ID segment of S, namely, until indexes on S can be completely migrated to M1 and N1; and then the following steps are performed so as to quit the management system.

S44. Each of the two management nodes that receive the message that includes the ID segment returns a response message to the management node that receives the quit message.

Specifically, M1 returns a response message to S, and N1 returns a response message to S.

It should be noted here that if a certain node of the management nodes is in a locked state, after receiving the message that includes the ID segment, the management node that is in the locked state sends a rejection message to the management node that receives the quit message. In this case, the management node that receives the quit message waits for a period, and then sends again the message that includes the ID segment to the management node that sends the rejection message, until the management node that sends the rejection message can perform migration and returns a response message to the management node that receives the quit message.

S45. The management node that receives the quit message locks itself, that is, does not respond to requests sent by other nodes, and migrates the index(es) corresponding to the two ID segments to the corresponding management nodes.

Specifically, S locks itself, and migrates, to M1, the index corresponding to the ID segment that is allocated to M1 and migrates, to N1, the index corresponding to the ID segment that is allocated to N1.

S46. After completion of the migration, the management node that receives the quit message is unlocked, and sends a quit message to each management node in the system and to the node management server, to notify each management node and the node management server that the management node itself quits.

Specifically, S sends a quit message to each management node in the management system and to the node management server, to notify each management node and the node management server that S quits.

It should be noted here that after completion of the migration, the index(es) and the ID segments managed by the two management nodes that take over the migrated ID segment (namely, M1 and N1) have changed. Therefore, each of M1 and N1 send a change message to each management node in the management system and to the node management server, where the change message includes at least the ID segment managed by the management node and the address information. The management node that receives the change message may update its information list of other management nodes according to the ID segment managed by the management node and the address information included in the change message. The node management server that receives the change message may maintain a list of added management nodes according to the ID segment managed by the management node and the address information included in the change message.

S47. The management node that receives the quit message deletes information about the quit management node from its own information list of other management nodes, and the node management server that receives the quit message deletes the information about the quit management node from the list of the added management nodes.

After the information about the quit management node is deleted, the management node and the node management server may return a response message to the quit management node.

The technical solution that the management node quits the management system in this embodiment may prevent the quit of a management node from affecting normal work of the management system, and so as to ensure normal management services provided by the management system.

Figure 8:
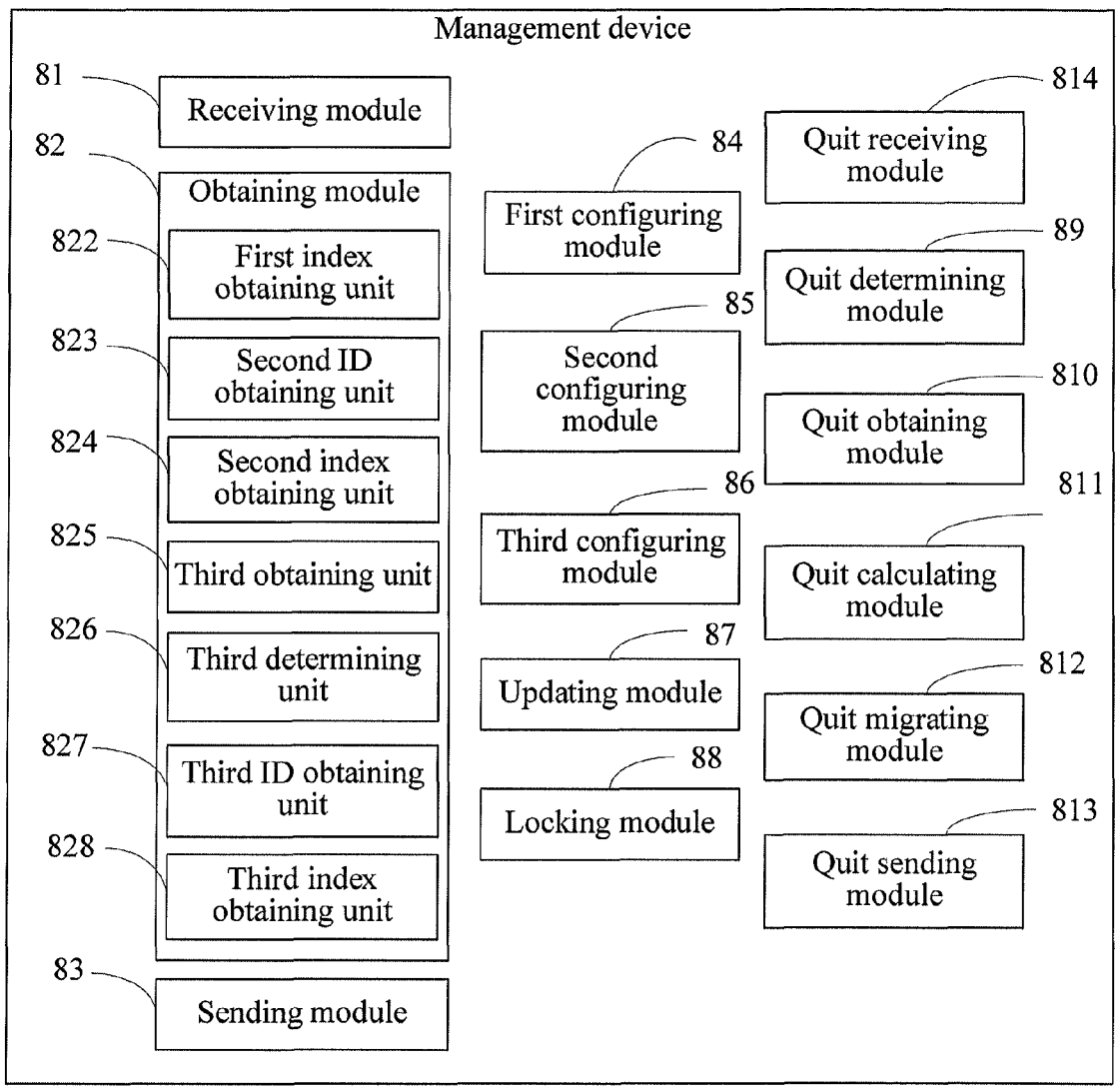
FIG. 8 is a schematic structure diagram of a management device according to the fourth implementation solution of the present invention.

The following embodiment describes a management device of a fifth implementation solution of the present invention. The management device implements the methods described in the foregoing embodiments. As shown in FIG. 8, the management device includes a receiving module 81, an obtaining module 82 and a sending module 83.

The receiving module 81 is configured to receive information about added management nodes from a node management server, where the information about the added management nodes includes at least address information of the added management nodes; The obtaining module 82 is configured to use the address information of the added management nodes to obtain an index(es) with continuous ID segments, where the address information is received by the receiving module 81; and the sending module 83 is configured to send an adding message to all management nodes, where the adding message at least includes continuous ID segments managed by a local node and obtained by the obtaining module 82 and address information of the local node.

Further, the obtaining module 82 in this embodiment includes a first index obtaining unit 822.

When the address information of the added management nodes received by the receiving module 81 is empty, the first index obtaining unit 822 is configured to use the index corresponding to a whole ID segment as an obtained index corresponding to the ID segment.

The obtaining module 82 in this embodiment further includes a second ID obtaining unit 823 and a second index obtaining unit 824.

When the information about the added management nodes received by the receiving module 81 includes address information of one management node, the second ID obtaining unit 823 is configured to use the index corresponding to a first half or second half of the ID segment of the management node as the obtained index corresponding to the continuous ID segment. The second index obtaining unit 824 is configured to request, through the address information of the management node, the management node to migrate the index corresponding to the continuous ID segment which is obtained by the second ID obtaining unit 823.

The obtaining module 82 in this embodiment further includes a third obtaining unit 825, a third determining unit 826, a third ID obtaining unit 827, and a third index obtaining unit 828.

When the information about the added management nodes received by the receiving module 81 includes address information of at least two management nodes, the third obtaining unit 825 is configured to request, through the address information of a random management node of the at least two management nodes, obtaining the load and information of all management nodes from the random management node, and the load and information of all management nodes include the load and information about the added management nodes; the third determining unit 826 is configured to determine two management nodes with the largest sum of loads and continuous ID segments according to the load and information of all management nodes obtained by the third obtaining unit 825; the third ID obtaining unit 827 is configured to calculate out the length of two ID segments that may be taken over from the two management nodes according to the loads of the two management nodes determined by the third determining unit 826; and the third index obtaining unit 828 is configured to request the two management nodes to migrate an index(es) corresponding to the length of the two ID segments obtained by the third obtaining unit 827, so as to obtain the index(es) corresponding to the two ID segments.

Further, the management device in this embodiment may further include the following optional modules: a first configuring module 84, a second configuring module 85, a third configuring module 86, an updating module 87, and a locking module 88.

The first configuring module 84 is configured to use the information about the added management nodes received by the receiving module 81 to configure an information list of other management nodes; the second configuring module 85 is configured to configure a management content space according to the continuous ID segment obtained by the obtaining module 82; and the third configuring module 86 is configured to configure a content list according to the index corresponding to the ID segment obtained by the obtaining module 82.

The updating module 87 is configured to update the information list of other management nodes according to the ID segment and address information included in the adding message that is received; the updating module 87 is further configured to update the information list of other management nodes according to an ID segment and address information included in a received change message and/or a received quit message; and the locking module 88 is configured to lock a local node in the process of migrating the index, that is, does not respond to requests sent by other management nodes.

Further, to enable the management device in this embodiment to quit the management system when necessary, the management device in this embodiment further includes the following optional modules: a quit receiving module 814, a quit determining module 89, a quit obtaining module 810, a quit calculating module 811, a quit migrating module 812, and a quit sending module 813.

The quit receiving module 814 is configured to receive a quit message from the node management server; the quit determining module 89 is configured to determine two management nodes from the information list of other management nodes after the quit receiving module 814 receives the quit message, where the ID segment of the local node is between ID segments of the two management nodes; the quit obtaining module 810 is configured to obtain the loads of the two management nodes determined by the quit determining module 89; the quit calculating module 811 is configured to calculate two ID segments that may be migrated to the two management nodes, according to the loads of the two management nodes obtained by the quit obtaining module 810; the quit migrating module 812 is configured to migrate the index(es) corresponding to the two ID segments calculated out by the quit calculating module 811 to the two management nodes; and the quit sending module 813 is configured to send a quit message to all management nodes and the node management server after the quit migrating module 812 completes migration.

The management device provided in this embodiment has the following benefits: The ID segment managed by the management device is a continuous ID segment so that the ID of the file that needs to be searched for can be located quickly; the expansion process that occurs when the management device is added to the management system and the process of quitting the management system are automatic, and involve no manual operation, which improves availability of the management device. At the time of expansion, the management device selects two management nodes with heaviest loads to perform index migration, and therefore, the little workload is involved and no impact is caused to other management nodes, and little impact is caused to the management performance of the whole management system.

Through the implementation description, those skilled in the art may clearly understand that the present invention may be implemented through software plus a necessary universal hardware platform, and definitely may be implemented through hardware; however, in most circumstances, preferably through software in addition to a necessary universal hardware platform. On the basis of such understanding, the essence of the technical solution of the present invention or the part that makes contribution to the prior art may be embodied in a software product. The software product is stored in computer-readable storage media such as computer floppy disk, hard disk and CD-ROM, including several instructions for instructing a device (it may be a server or it may also be a host) to execute part or all of the methods in the embodiments of the present invention.

The above descriptions are merely exemplary embodiments of the present invention, and the protection scope of the present invention is not limited thereto. Any modifications, variations or replacement that can be easily derived by those skilled in the art should fall within the protection scope of the present invention. Therefore, the protection scope of the present invention is subject to the appended claims.

What is claimed is:

1. A method for adding a new node into a system, the method performed by the new node comprising:
   receiving node information from a management server of the system, wherein the node information indicates that the system includes at least two added nodes, wherein the node information includes address information of each added node;
   identifying an added node from the added nodes;

sending a request message to the identified added node according to address information of the identified added node;

receiving a response message response to the request message, wherein the response message includes load value of each added node and ID segments managed by each added node, wherein the load value indicates load information;

determining a first node and a second node from the added nodes, wherein a sum of a first load value and a second load value is greater than a sum load values of two any remaining added nodes with continuous ID segments in the system, wherein first ID segments managed by the first node is continuous to second ID segments managed by the second node;

calculating a first length of ID segments to be taken over from the first ID segments, based upon the first load value;

calculating a second length of ID segments to be taken over from the second ID segments, based upon the second load value;

instructing the first node to migrate a part of the first ID segments whose length is equivalent to the first length to the new node; and instructing the second node to migrate a part of the second ID segments whose length is equivalent to the second length to the new node, wherein the part of the first ID segments is continuous to the part of the second ID segments.

2. The method according to claim 1, wherein each added node stores an information list which comprises address information of the added node and ID segments managed by the added node;

and wherein the method further comprises:

sending address information of the new node and the two parts of ID segments to each added node to update the information list.

3. The method according to claim 1, wherein before the step of instructing the first node to migrate a part of the first ID segments, the method further comprising:

determining that the first node is not in a locked state; and wherein before the step of instructing the second node to migrate a part of the second ID segments, the method further comprising:

determining that the second node is not in a locked state.

4. A data node, comprising:

an interface for communicates with a management server and other added nodes in a system; and a processor configured to:

receive node information from the management server through the interface, wherein the node information indicates that the system includes at least two added nodes, wherein the node information includes address information of each added node;

identify an added node from the added nodes;

send a request message to the identified added node through the interface, based on address information of the identified added node;

receive a response message response to the request message through the interface, wherein the response message includes load value of each added node and ID segments managed by each added node, wherein the load value indicates load information;

determine a first node and a second node from the added nodes, wherein a sum of a first load value and a second load value is greater than a sum load values of two any remaining added nodes with continuous ID segments in the system, wherein first ID segments managed by the first node is continuous to second ID segments managed by the second node;

calculate a first length of ID segments to be taken over from the first ID segments, based upon the first load value;

calculate a second length of ID segments to be taken over from the second ID segments, based upon the second load value;

instruct the first node to migrate a part of the first ID segments whose length is equivalent to the first length to the new node; and instruct the second node to migrate a part of the second ID segments whose length is equivalent to the second length to the new node, wherein the part of the first ID segments is continuous to the part of the second ID segments.

5. The node according to claim 4, wherein each added node stores an information list which comprises address information of the added node and ID segments managed by the added node, and wherein the processor is further configured to send address information of the new node and the two parts of ID segments to each added node to update the information list.

6. The node according to claim 4, wherein the processor is further configured to determine that the first node is not in a locked state, before instructing the first node to migrate a part of the first ID segments; and determine that the second node is not in a locked state, before instructing the second node to migrate a part of the second ID segments.

7. A system for adding new node, comprising:

a management server, a plurality of added nodes and a processor, wherein the management server configured to send node information to the new node, wherein the node information indicates that the system includes at least two added nodes, wherein the node information includes address information of each added node;

the new node is configured to identify an added node from the added nodes;

send a request message to the identified added node according to address information of the identified added node;

receive a response message response to the request message, wherein the response message includes load value of each added node and ID segments managed by each added node, wherein the load value indicates load information;

determine a first node and a second node from the added nodes, wherein a sum of a first load value and a second load value is greater than a sum of load values of two any remaining added nodes with continuous ID in the system, wherein the first ID segments managed by the first node is continuous to second ID segments managed by the second node;

calculate a first length of ID segments to be taken over from the first ID segments, based upon the first load value;

calculate a second length of ID segments to be taken over from the second ID segments, based upon the second load value;

instruct the first node to migrate a part of the first ID segments whose length is equivalent to the first length to the new node; and instruct the second node to migrate a part of the second ID segments whose length is equivalent to the second length to the new node, wherein the part of the first ID segments is continuous to the part of the second ID segments.

8. The system according to claim 7, wherein each added node stores an information list which comprises address information of the added node and ID segments managed by the added node, and wherein the new node is configured to send address information of the node and the two parts of ID segments to each added node to update the information list.

9. The system according to claim 7, wherein the new node is further configured to determine that the first node is not in a locked state, before instructing the first node to migrate a part of the first ID segments.

* * * * *